United States Patent [19]

Barlian

[11] Patent Number: 4,534,662
[45] Date of Patent: Aug. 13, 1985

[54] DEVICE FOR DETECTING VAPOR LEAKAGES

[76] Inventor: Reinhold Barlian, Dieselstrasse 6, 6990 Bad Mergentheim, Fed. Rep. of Germany

[21] Appl. No.: 367,242
[22] PCT Filed: Jul. 25, 1981
[86] PCT No.: PCT/DE81/00114
§ 371 Date: Apr. 6, 1982
§ 102(e) Date: Apr. 6, 1982
[87] PCT Pub. No.: WO82/00521
PCT Pub. Date: Feb. 18, 1982

[30] Foreign Application Priority Data

Aug. 9, 1980 [DE] Fed. Rep. of Germany ....... 3030296

[51] Int. Cl.³ ............................................. G01M 3/00
[52] U.S. Cl. ........................................ 374/4; 374/142; 340/605
[58] Field of Search ..................... 73/40.5 R; 340/605; 374/4, 142

[56] References Cited

FOREIGN PATENT DOCUMENTS 0081285 7/1978 Japan ..................................... 374/4

Primary Examiner—Herbert Goldstein
Attorney, Agent, or Firm—Cushman, Darby & Cushman

[57] ABSTRACT

The device is used for detecting leakages of steam contained in hollow bodies, particularly in pipes (26). It is intended for tending high temperature steam conduits. The hollow body is surrounded by a thermal insulation (24) containing a measuring chamber (28). A temperature sensor (32) and a steam detector (9, 18) are disposed within that measuring chamber. Signalling apparatus announces the simultaneous presence of steam and temperature drop. When the pressurized steam contained in the hollow body or in the conduit happens to leak, it expands thereby producing a temperature drop. The sensing of both effects, i.e. the temperature drop and the presence of vapor avoids erroneous warnings.

10 Claims, 6 Drawing Figures

DEVICE FOR DETECTING VAPOR LEAKAGES

The present invention is with respect to a device for detecting steam leaking from hollow bodies, more specially pipes.

The invention is more specially important for keeping a watch on superheated steam ducts, more specially in nuclear power plant. In the prior art, there have been three ways of doing this so far:

(1) Inspection by those running the plant, something which is not possible all the time and without danger, in nuclear plant, to those inspecting.

(2) Measuring the pressure. It is then not possible for small leaks to be detected and changes in pressure caused by other effects than leaks give a false alarm.

(3) Measuring radio-activity if the steam in the pipes is radio-active. However, the radio activity of the steam is not constant so that false alarms are produced. Furthermore, this method is not very sensitive.

The present invention is based on the fact that the development of the start of a sub-crititcal steam pipe crack into a full burst takes a long time, for example 60 minutes, long enough for shutting down the steam pipe in danger. However, it is necessary to have some way of quickly detecting the start of a cracking process, which will be marked by the leaking of steam out of the pipe.

The purpose of the invention is to make this possible. Furthermore, false alarms are to be stopped as far as possible.

This purpose is effected by the invention as made clear by the following description and claims.

In the invention two different physical effects are measured, namely on the one hand a leaking of steam out into the measuring space and on the other hand a temperature drop in the same. On steam under gage pressure in the pipe or other hollow body making its way out through a leak, there will be expansion and a fall in temperature of the steam, the degree of such a temperature drop giving a certain and safe measurement. By measuring the two different effects, it will generally not be possible for false alarms to be produced, the device only producing an output signal, such as an alarm signal, on the two effects taking place at the same time.

The useful effects of the invention are: full-time monitoring of the system. Monitoring may be undertaken from a great distance away so that there is no danger to workers. Furthermore, low rates of leaking may be safely detected. Because of the high sensitivity, sub-critical leaks may be detected so early on that there is enough time for shutting down the part of the plant in question, that is to say it is not necessary for the plant to be very quickly shut down as an emergency in a power plant for example. The device is low in price and upkeep is simple.

Using the further development of the invention, the position of a leak may be made out without any trouble so that, once the fact that a leak is present has become clear, the discovery of its position without much time being necessary for looking for it will be possible.

Using the still further development of the invention, a number of measuring points may be spaced out along each length so that near each point, at which a leak is likely, there will be at least one measuring point. Having a number of like measuring feelers on each length makes operation safer. Furthermore, a reading is quickly produced.

The system is very simple and, for this reason, low in price.

A further development gives a high reading sensitivity and makes it possible for the position of damage to be made out.

Further with respect to different feelers for temperature and steam, all give a sensitive and quick reading. An account will now be given of embodiments of the invention using the figures.

Figure 1:
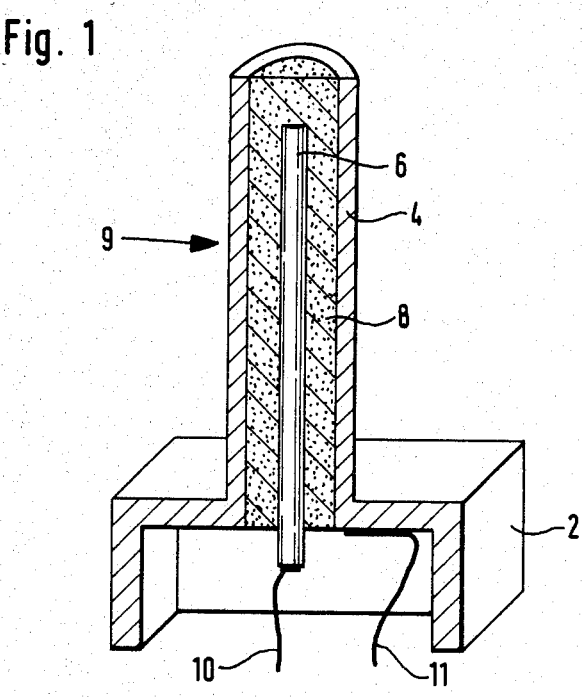
FIG. 1 is a perspective view and part axial section of a coaxial form of steam detector.
Figure 2:
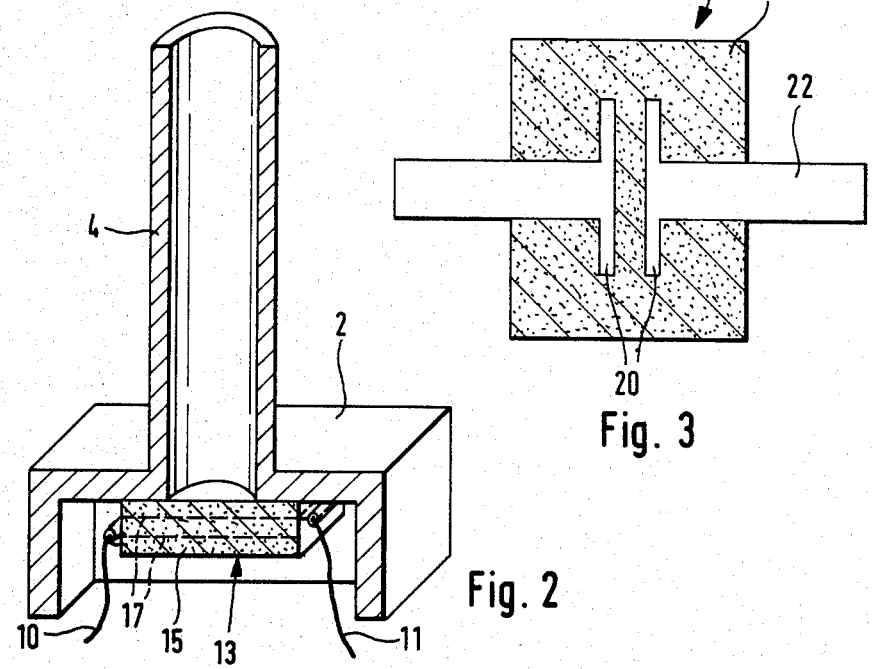
FIG. 2 is a view on the same lines of a steam detector in the form of a with parallel electrodes and a steam inlet pipe next thereto

In the embodiments of FIGS. 1 and 2 there is, in each case, a housing 2 having a pipe 4, the two being made for example of steel. In FIG. 1 a metal rod 6 will be seen running downwards into the middle of the housing 2, the rod, however, ending some distance short of the end of pipe 4. The space between the rod 6 and the pipe 4 and thereover is filled up with insulating material 8, in the present case ceramic material or sintered grains of glass. The selection of the insulating material and the materials of the pipe 4 and the rod 6 is such that they have roughly the same coefficients of thermal expansion so that the steam detector, generally numbered 9, is not damaged by thermal loads. Rod 6 and housing 2 are used as two electrodes and have leads, 10 in the one and 11 in the other case.

Figure 3:
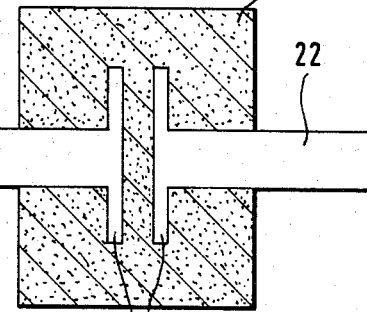
FIG. 3 is a view of a further form of a steam detector as in FIG. 2.

In the device of FIG. 2, pipe 4 is kept empty, the steam detector 13 in the limited sense of the word being fixed in housing 2 so that its top face is uncovered and facing into the pipe. Inside the insulating material 15 there are two electrodes 27, parallel to each other and having insulating material all round them (so that they are only to be seen in the section). Again, they have leads 10 and 11. FIG. 3 is a view of a further form of a contact steam detector 18, two electrodes 20, for example in the form of round plates, cased in insulating material 15 and having leads 22 running from the electrodes to the outside.

Figure 4:
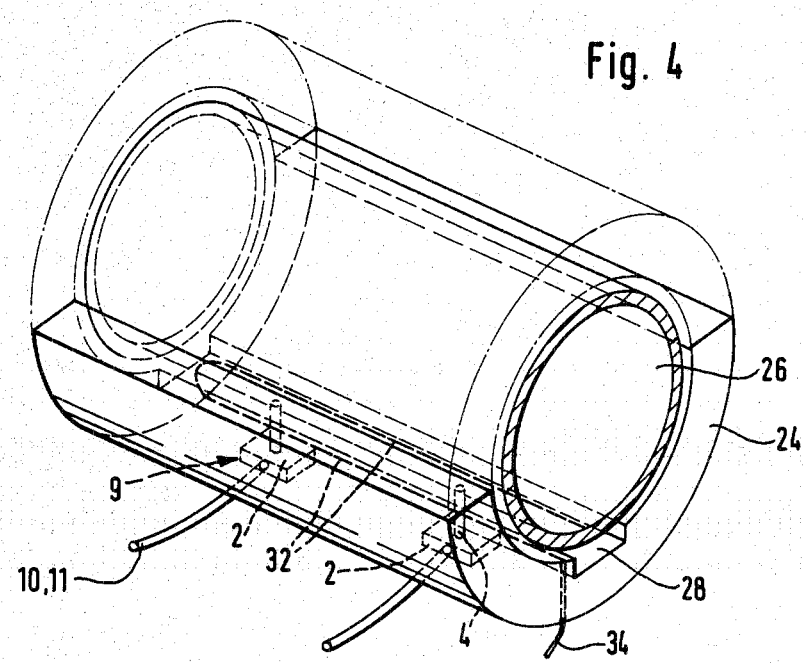
FIG. 4 is a perspective view of a piece of steam piping with parts of two insulating cases, a temperature feeler and two steam detectors.
Figure 5:
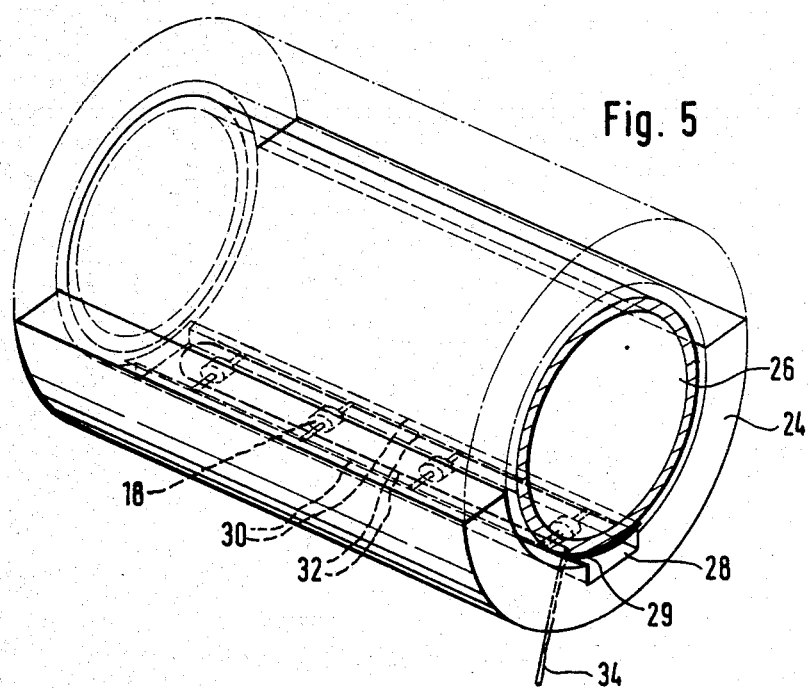
FIG. 5 is a view of other steam detectors, the general system being in other respects as in FIG. 4.

FIGS. 4 and 5 are, in each case, a view of a length of steam pipe 26 having two insulating cases 24 placed round it for heat insulation. The front radial faces of the cases are to be seen in perspective, end-on view, while the left hand, back end faces are to be thought of as section faces. The insulating cases are in the form of sheet metal housings full of an insulating filler, as for example rockwool, each of the two cases forming a half-shell with a length of about one meter. The two cases may be readily taken off the pipe (after undoing parts joining them together which are not to be seen in the figure) and put on the pipe again. The lower case 24 has a pocket 28 stretching in the length direction and normally along the weld in the steam pipe 26, the pocket being covered over by a perforated piece of sheet metal 29 (FIG. 5) if desired.

In the embodiment of the device of FIG. 4, steam detectors as in FIG. 1 or FIG. 2 are used, their pipes 4 running upwards into the pocket 28 so that, on any steam coming out through a leak, the steam, moving into the pocket 28 for measuring purposes, will take effect on the insulating material 8 at the top end of pipe 4 (in FIG. 1) or (FIG. 2) will make its way through the pipe 4 to the insulating material 15. The housings 2 of the steam detectors are seated against the lower part of the insulating case 24. The leads 10 and 11 are connected to a resistance and/or capacity measuring instrument, which is placed in an instrument room, for example in the plant supervisor's office of a nuclear power plant.

In the device of FIG. 5, a number of steam detectors 18 are placed in the pocket 28, such detectors being designed as in FIG. 3 or having electrodes of some other form within a ceramic body. The steam detectors 18 are connected in parallel by wires 30 marked in broken lines.

On steam making its way into pocket 28, it will makes its way furthermore into the insulating material of at least one of the steam detectors so that the ohmic resistance and the capacitance will undergo a sharp drop, at least one of these effects being detected by the measuring instrument.

If the systems of FIGS. 4 and 5 were made with steam detectors only, false alarms might be produced if, without any steam leaking out of the pipe 26, the insulating material of the steam detectors were to be wetted for some other reason, for example by moisture coming into the pocket 28 from the outside. For stopping false alarms being given in such cases, there are furthermore temperature feelers or probes which may, as in FIGS. 4 and 5, have the form of loops 32. Along each length of about one meter it is for example possible to have three spaced loops 32, each with a lead 34. Such a design is best if the loops each have one thermo-element. The thermo-element may then be in the form of a pipe thermo-element, the guard pipe forming the one leg of the thermocouple, while a middle wire is the other leg. In place of this, the temperature feeler may be in the form of a casing-type thermo-element with the two legs of the thermocouple insulatingly housed in a metal pipe. As a radiation-resistant material for the thermocouple it is possible to use for example chromnickel and nickel. By placing such thermo-elements in the form of generally short loops 32, it is possible to make certain that any possible leak will never by very far from the sensitive part of a thermo-element.

In place of the loops 32 as figured, it is possible to have a resistance feeler, for example in the form of nickel 1000 or platinum 100 stretching along the full length of the length of pipe.

When there is a temperature drop, the instruments connected to the feelers will give a reading because of a drop in voltage at the output of the thermo-elements while at the output of resistance feelers, the resistance will go down.

Figure 6:
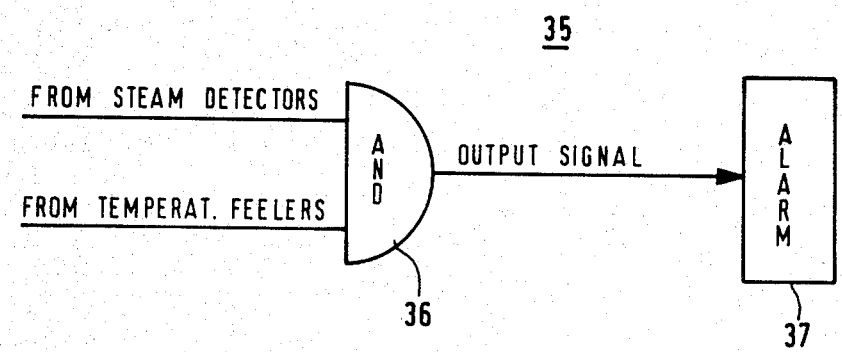
FIG. 6 is an exemplary warning instruments.

The steam detectors and the temperature feelers are connected up by way of plug contacts on the outside of the insulating cases 24. Each insulating material case is then connected to the next cases to it by plug contacts, their leads running to a central instrument room. Such leads have a high quality insulation and are screened off against electro-magnetic fields. The signals from a steam detector on the one hand and from the temperature feelers on the other go for example to the inputs of a warning instrument 35 (FIG. 6) which includes an AND-gate 36 and warning device or alarm 37, so that the AND-gate will only give an output signal to cause a warning signal from alarm 37 only when the steam detectors give a signal with respect to the presence of steam or moisture and similtaneously the temperature feelers give a temperature drop signal. It is only in this case that an output signal will be produced by the instrument, for example for giving an alarm signal or producing some sort of warning.

It is furthermore to be noted that no output signal will be produced by the instrument if there is only a drop in temperature in the pocket for measuring purposes without any leaking of steam. In this case, the steam detectors will not give any output signal.

I claim:

1. A device for detecting steam leaking from hollow bodies above ground including pipes for gauge pressure steam, comprising:
   thermal insulation disposed around a said hollow body, there being between said insulation and body a space for measuring purposes,
   temperature change sensor means disposed in said space for providing at least one output signal response to a predetermined change in temperature in said space,
   steam detector means having at least inlet means disposed in said space for providing at least one output signal in the event steam is sensed by the detector means in said space,
   said steam detector means including at least one steam detector having a capacitor-like structure including a porous insulating material able to take up steam through said inlet means, and
   warning means connected to receive said output signals from both the temperature change sensor means and the steam presence detector means for providing an output only upon receiving a said output signal from each simultaneously.

2. A device as claimed in claim 1 wherein:
   the thermal insulation is divided into separate lengths; and
   said sensor means includes a plurality of temperature change sensors and said steam detector means includes a plurality of said steam detectors, said sensors and detectors being paired at different ones of said lengths,
   said warning means including a plurality of warning devices respectively coupled to said sensor-detector pairs for readily determining from which of said lengths a warning signal is derived.

3. A device as claimed in claim 2, wherein:
   the lengths of insulation are divided into at least two segment-like shells;
   said space being a longitudinal recess in at least one of the segment-like shells and being in the form of a channel-like measuring pocket running more specially along a weld in said hollow body; and
   a plurality of said sensor-detector pairs being disposed along a length of the pocket.

4. A device as claimed in claim 3, characterized in that the signal outputs of the steam detectors of one length are connected together in parallel.

5. A device as claimed in claim 3 or claim 4, characterized in that that signal outputs of the steam detectors of one length are connected up as such with a respective warning device.

6. A device as claimed in anyone of claims 1, 2, 3 or 4 wherein said temperature change sensor means includes resistance feelers.

7. A device as claimed in anyone of claims 1, 2, 3 or 4 wherein said temperature change sensor means includes thermo-elements.

8. A device as claimed in claim 1, 2, 3 or 4, characterized in that the steam detector means are located at the outer face of said thermal insulation and have a pipe connected with said space for measuring purposes.

9. A device as claimed in claim 1, 2, 3 or 4, characterized in that the steam detector means are disposed in a separate pipe which extends through said thermal insulation into said space.

10. A device as in claim 1, 2, 3 or 4 wherein said temperature change sensor means provides an output signal only in response to a temperature drop in said space.

* * * * *